US008175094B2

(12) United States Patent
Bauchot et al.

(10) Patent No.: US 8,175,094 B2
(45) Date of Patent: May 8, 2012

(54) METHOD AND SYSTEM FOR PERSONALIZING A MULTIMEDIA PROGRAM BROADCASTED THROUGH IP NETWORK

(75) Inventors: Frederic Bauchot, La Gaude (FR);
Jean-Claude Dispensa, La Gaude (FR);
Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 12/530,835

(22) PCT Filed: Jan. 28, 2008

(86) PCT No.: PCT/EP2008/050974
§ 371 (c)(1),
(2), (4) Date: Dec. 15, 2009

(87) PCT Pub. No.: WO2008/122451
PCT Pub. Date: Oct. 16, 2008

(65) Prior Publication Data
US 2010/0111085 A1    May 6, 2010

(30) Foreign Application Priority Data

Apr. 6, 2007   (EP) .................................... 07300931
Jan. 28, 2008  (WO) ................. PCT/EP2008/050974

(51) Int. Cl.
*H04L 12/28* (2006.01)
(52) U.S. Cl. ........ 370/390; 370/432; 370/252; 370/392; 725/36

(58) Field of Classification Search ........................ None
See application file for complete search history.

(56) References Cited

U.S. PATENT DOCUMENTS 6,463,585 B1   10/2002   Hendricks et al.
(Continued)

FOREIGN PATENT DOCUMENTS
WO   W09830025   7/1998

OTHER PUBLICATIONS

Ko et al.; Geocasting in Mobile Ad Hoc Networks: Location-Based Multicast Algorithms; Mobile Computing Systems and Applications, 1999. Proceedings. WMSCA '99. Second IEEE Workshop on New Orleans, LA, USA Feb. 25-26, 1999, Los Alamitos, CA, USA, IEEE Comput. Soc, US, Feb. 25, 1999; pp. 101-110; XP010323388.

*Primary Examiner* — Duc C Ho
(74) *Attorney, Agent, or Firm* — Schmeiser, Olsen & Watts; John Pivnichny

(57) ABSTRACT

A method and a system. A Medium Access Control (MAC) frame includes an embedded Internet Protocol (IP) frame and a MAC address. The IP frame includes content of a second multimedia program and a second multicast address of the second multimedia program, the MAC address having been resolved from the second multicast address. The second multicast address is determined to be linked to a first multicast address of a first multimedia program of a television channel being played at a user host. The IP frame is forwarded from the MAC frame to an IP layer where the second multicast address is ascertained to be a multicast sub group address of the first multimedia program and is replaced in the IP frame with the first multicast address, after which the IP frame is transmitted to the user host to replace or be inserted into the first multimedia program being played.

20 Claims, 7 Drawing Sheets

U.S. PATENT DOCUMENTS

| | | | |
|---|---|---|---|
| 7,600,250 B2 * | 10/2009 | Carr | 725/110 |
| 7,983,256 B2 * | 7/2011 | Kimura et al. | 370/389 |
| 2002/0104083 A1 | 8/2002 | Hendricks et al. | |
| 2005/0028219 A1 | 2/2005 | Atzmon et al. | |
| 2005/0066372 A1 | 3/2005 | Bertin | |

* cited by examiner

NIC_MulticastAddrTable

| Multicast MAC Address | Multicast Address Mask |
|---|---|
| 01.00.5E.4D.62.80<br>/*224.77.98.128*/ | 00.00.00.00.00.03<br>/*224.77.98.131*/ |
| 01.00.5E.64.03.80<br>/*224.100.3.128*/ | 00.00.00.00.00.00<br>/*No alternate address*/ |
| ...0A.2E<br>/*224.13.10.46*/ | 00.00.00.00.00.00 /*No alternate address*/ |

Fig. 7

IP_MulticastAddrTable    131*/

| Multicast Address | Multicast Group Sub Address |
|---|---|
| 224.77.98.128 | 224.77.98.131 |
| 224.100.3.128 | "" |
| ...10.4.6 | "" |

Fig. 9

METHOD AND SYSTEM FOR PERSONALIZING A MULTIMEDIA PROGRAM BROADCASTED THROUGH IP NETWORK

FIELD OF THE INVENTION

The present invention relates to the field of multimedia programs broadcasted through IP networks, especially Television through the Internet (IP TV). More precisely, this pertains to a method and system for replacing a main multimedia program with a personalized replacement program, such as an advertisement program inserted into a main program of a TV channel.

BACKGROUND OF THE INVENTION

With the recent technology advance in Internet based communications, television broadcast has entered a new age where communication infrastructures are less and less based on analogical, with cable or hertzian terrestrial networks. IP-based digital video is today becoming a standard, leveraging the broadband communication capabilities of new digital networks: satellite based, or cable based, or xDSL (i.e. ADSL, SDSL, etc.) based or even wireless based (3G) infrastructures.

Multichannel packages are becoming a common offering, often through Internet Service Providers, that TV operators propose to an increasing range of subscribers. With such packages, it becomes today common that subscribers can receive more than hundred different channels through their Internet connection.

A current trend for implementing TV over the Internet is based on the "Multicast" protocol, which may also be used in any other network using the Internet Protocol (IP).

The Multicast is a technology enabling for one host (hereafter called server) a connection to all the users hosts belonging to the multicast group, as depicted hereafter in FIG. 1. The stream is sent via the network and then the users could subscribe to be part of the multicast group via an Internet Group Management Protocol (IGMP) command. In such a case, one stream is emitted from one server and received by several users hosts.

Advertising is and will remain a significant revenue contributor for TV channel operators, including in the field of digital IP TV. The efficiency, and hence its value, of advertisements in TV programs is highly dependent on its capacity to accurately target the viewers that may correspond to the object of such an advertisement.

Since several years, the advertising clips are broadcasted to try to reach a given audience, based first on the channel it is broadcast on, and also on the timing. As an example, clips targeting a K-12 audience are commonly available when cartoons are broadcasted, while automotive industry clips are commonly available during a Formula 1 grand prix broadcast. Although this approach can claim to reach a targeted audience, there is no way to really cope with the personal profile, e.g. buying profile, of the TV watcher.

Customizing some parts of a program within a common main channel's program may also be of some interest for meeting more accurately the wishes or needs of users receiving these programs, or for building programs interacting with the users.

OBJECTS OF THE INVENTION

It is an object of the present invention to enable customizing some part of a common program broadcasted on an IP network, such as the Internet or any specific IP network.

Another object is furthermore to enable inserting customized advertisement programs within such a main program, according to several groups or categories of users or of user hosts.

SUMMARY OF THE INVENTION

Such objects are accomplished through using different multicast addresses for transmitting, on one hand, the main program, and, on the other hand, one or several replacement or insertion programs.

For the watcher or user host, the present invention proposes a system and/or a method for automatically replacing a first multimedia program, received through a multicast IP network on a first multicast address and played by a user host, with a second multimedia program. According to the invention, such a method comprises the steps of:

receiving the at least one second multimedia program through said multicast IP network on a second multicast address different from the first multicast address; and switching said at least one user host playing from the first multimedia program received on said first multicast address towards said at least one second program received on the second multicast address, said second multicast address being linked to said first multicast address through a switch datum.

More precisely, this can be reached through at least one user host belongs simultaneously to a first multicast group of a first plurality of user hosts having said first multicast address and to a second multicast group of a second plurality of user hosts having said second multicast address.

Preferentially, the switch datum is stored in the user host.

In a preferred embodiment, at the user side, the invention further comprises a step of transmitting toward the playing means of said at least one user host, program data received on both said first and second multicast addresses by communication means of said at least one user host.

Accordingly, at emitter side, the invention comprises the further steps of:

interrupting the flow of program data received on said first multicast address, and starting sending a flow of program data received on said second multicast address.

More specifically, the invention comprises the further step of modifying the program data received on said second multicast address so as to appear as coming from said first multicast address when transmitted to the playing means.

In an alternate embodiment, at the user side, the switching step further comprises the steps of:

modifying at least one selection datum stored in said user host, using said selection datum being for selecting the multicast address from which received program data are to be transmitted to said playing means.

transmitting toward the playing means of said at least one user host, program data received on only one of said first and second multicast addresses by communication means of said at least one user host.

Such a switching may comprise, as an example, filtering one of the two multicast addresses or selecting another address to receive data from.

In this alternate embodiment, the step of modifying the selection datum may be triggered by a result of a local process analysing the state of the user host or of the data received on first or second multicast address. As an example, switching may be triggered by detecting an incoming event from the previously silent multicast address. Also, the step of modifying the selection datum may be triggered by receiving a signalling data.

Both embodiments may be combined in different ways. As an example, one embodiment may be used in some context (e.g. for advertisements during a film, or at certain specific hours), while the other may be used in some other context (e.g. between films, or at other specific hours).

Differents embodiments may also be used at the same time with different user hosts, according to the compatibility of these user hosts.

In both embodiments, the invention propose to group users according to heir profiles, possibly recognized and classified through their account identifier or authentication process with the Internet Service Provider or TV Operator.

The invention thus includes a method for automatically replacing a main multimedia program, received through a multicast IP network on a first multicast address and played by a plurality of user hosts, with a replacement program.

Accordingly, said method comprises the steps of:
running the method for replacing said main multimedia program with a first replacement program, according to a first switching datum, for at least one user host of a first group of user hosts, and
running the method for replacing said main multimedia program with a second replacement program, according to a second switching datum, for at least one user host of a second group of user hosts.

In the preferred embodiment, the invention thus also includes a method for inserting a targeted program into a main multimedia program received through a multicast IP network on a first multicast address and played by a plurality of user hosts configured for using a method according to the preferred embodiment. According to this method, this targeted program is selected, for each individual user host, according to at least one feature of the user of said individual user host. Said insertion method then comprises, for each of said users, the steps of:
defining a switching datum according to the at least one feature and classifying said user into at least one user group out of a plurality of user groups, and
storing said switching datum into the host corresponding to said user;

Accordingly, at a given instant selected for inserting said targeted program into said main program, said insertion method comprises, at emitter side, the steps of:
interrupting emitting said main multimedia program, and
emitting each selected targeted program on a multicast address corresponding to the switching datum of the user group which is to receive said targeted program.

In the alternate embodiment, the invention also includes a method for inserting a targeted program into a main multimedia program received through a multicast IP network on a first multicast address and played by a plurality of user hosts configured for using such a method of program replacement. According to this method, this targeted program is selected, for each individual user host, according to at least one feature of the user of said individual user host. Said insertion method then comprises, for each of said users, the steps of:
defining a switching datum according to the at least one feature and classifying said user into at least one user group out of a plurality of user groups,
storing said switching datum into the host corresponding to said user;

Accordingly, at a given instant selected for inserting said targeted program into said main program, said insertion method comprises, at emitter side, the steps of:
emitting each selected targeted program on a multicast address corresponding to the switching datum stored in the hosts of the user group targeted by said targeted program is to be received by, and
emitting a signal configured for triggering the replacing of said main program by said targeted program in said user hosts.

This alternate embodiment thus enables to continuously emit a main multimedia program including a default second program, such as a default advertisement program. This default second program is then received and played by all users hosts not belonging to a specific user group, and thus having no personalized switch datum.

In the mean time, any user host with a personalized switch datum will receive and play a personalized inserted program according to the user group it belongs to. The filtering feature enables such personalized user hosts to play only the personalized second program, whithout interferences from the program emitted on the first multicast address.

The invention thus enables receiving of personalized advertising in IP TV environment. This implies all or part of the following features:
In each user host, at least a couple of addresses, one for the main service (TV channel) and an other for the advertising;
Users having same interest centre or similar profile are gathered in one or several groups;
Users are authentified when they are connected to any IP TV channel, which may be used for earmarking them to one group or another;
An advertising address is associated to each group of users;
User equipment subscribes to, and accepts to receive packets for the couple of addresses and translates the advertising address into the main service address;
In the user host, data are exclusively transmitted for the main service (TV Channel) or for the advertising.

Furthermore, the invention proposes to define new features within the structure of a IP multicast address, where:
the multicast address of the first program and the multicast address of the second address are different only in their lower bits; and/or
the multicast address for the first program is of an even type and the multicast of one or more second programs is of odd type.

In the case of an address used for transmitting an advertisement program corresponding to an advertising group pertaining to a defined channel, the invention proposes to define a partitioning of the multicast advertising group addresses where:
The seven last bits of main channel address are zero; and/or
Last bit of address is used to indicates an advertising address; and
The six bits before indicate the advertising group.

BRIEF DESCRIPTION OF THE DRAWINGS

The invention itself, as well as a preferred mode of use, further objects and advantages thereof, will best be understood by reference to the following detailed description of an illustrative detailed embodiment when read in conjunction with the accompanying drawings, wherein:

FIG. 7 represents a multicast address table for managing alternative sub-addresses in the network interface controller according to the invention;

FIG. 9 represents a multicast address table for managing alternative sub-addresses in the IP layer according to the invention.

PREFERRED EMBODIMENT OF THE INVENTION

In the following specifications, elements common to several figures are referenced through a common identifier.

Prior Art

Figure 1:
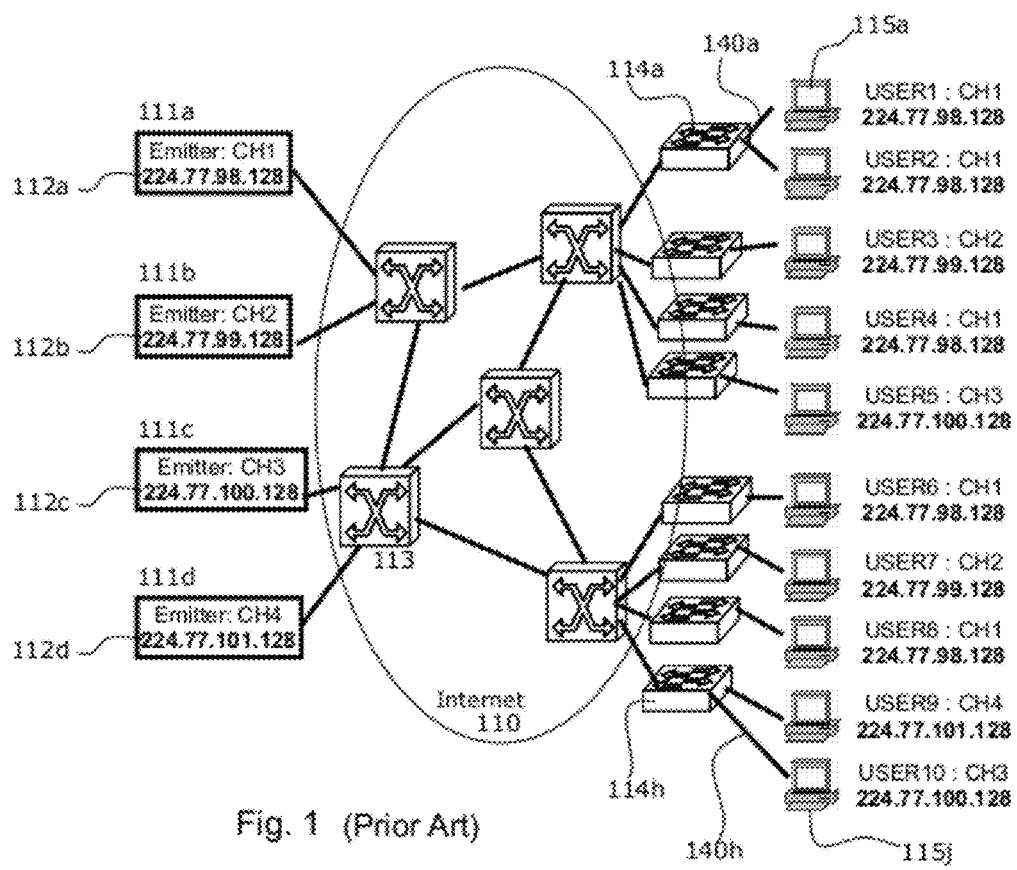
FIG. 1 illustrates a structure of IP digital TV broadcasting through the Internet, according to the prior art.

FIG. 1 illustrates the architecture currently known for broadcasting TV channel through an IP network, particularly the Internet.

Emitter hosts 111a to 111d, here also termed servers, are emitting multimedia programs for their respective channels CH1 to CH4, on their respective multicast addresses 112a to 112d. These programs are subdivided into IP frames that are transmitted through the Internet 110 by multicast capable routers 113 towards all user hosts registered to their respective multicast addresses, illustrated here as user hosts 115a to 115j. The user hosts may be any type of computerized device able to receive IP frames and process them to a hardware or software multimedia player. These may be micro computers, or TV digital set top boxes, or digital TV sets, or various arrangements of suitable means and softwares.

The user hosts 115a to 115j are registered into the right host groups for the corresponding frames to be forwarded to them through the Internet by the Multicast capable routers 113. Generally, an user host 115a is connected through a local area network 140a to 140h, such as an Ethernet LAN, with an Internet connection device 114a to 114h, such as a cable modem or an ADSL box. This connection device 114a acts as a bridge between the LAN 140a and the Internet 110 or external IP network.

In FIG. 1, illustrated users are receiving and playing different TV channels as follows:

CH1 with IP multicast address 224.77.98.128 is received by USER1, USER2, USER4, USER6 and USER8.
CH2 with IP multicast address 224.77.99.128 is received by USER3 and USER7.
CH3 with IP multicast address 224.77.100.128 is received by USER5 and USER10.
CH4 with IP multicast address 224.77.101.128 is received by USER9.

Multicast IP Connection

IP multicasting is the transmission of an IP datagram to a "host group", a set of zero or more hosts identified by a single IP destination address (i.e. the multicast address they are registered to). A multicast datagram is delivered to all members of its destination host group with the same "best-effort" reliability as a regular Unicast (i.e. with a unique destination) IP datagram.

The membership of a host group is dynamic; that is, hosts may join and leave groups at any time. There is no restriction on the location or number of members in a host group. A host may be a member of more than one group at a time. Hosts use the Internet Group Management Protocol (IGMP) to dynamically join or leave a group. It is defined in RFC1112 for IGMPv1 and in RFC2236 for IGMPv2.

Here are some essential details of IP multicast operation:
All multicast traffic is sent to a class D address in the range 224.0.0.0 through 239.255.255.255 (224.0.0.0/4). All traffic in the range 224.0.0.0 through 224.0.0.255 (224.0.0.0/24) is for the local subnet and is not forwarded by routers. Multicast-enabled routers forward multicast traffic in the range 224.0.0.1 through 239.255.255.255.
A specific multicast address is called a group address.
The set of hosts that listen for multicast traffic at a specific group address is called a multicast group or host group. Multicast group members can receive traffic to their unicast address and the group address. Multicast groups can be permanent or transient. A permanent group is assigned a well-known group address. An example of a permanent group is the all-hosts multicast group, listening for traffic on the well-known multicast address of 224.0.0.1. The membership of a permanent group is transient; only the group address is permanent.
There are no limits on a multicast group's size.
There are no limits on when members of a multicast group can join and leave a multicast group.
There are no limits on the number of multicast groups a host can belong to.

TCP/IP Address Resolution for IP Multicast Addresses Into IEEE 802.3 Multicast MAC Addresses Through the Internet or any types of other IP networks, datagrams are conveyed as frames structured according to the IP protocol. Such IP frames comprise mainly the origin and destination address. In case of multicast datagrams, this destination address is the IP formatted multicast address, such as the multicast address 112a (224.77.98.128) of the channel CH1.

On the data transport layer, the Medium Access Control (MAC) protocol is used. The MAC protocol encapsulates the payload data (IP frame) according to the topology of the physical network traveled. As an example, in an ATM portion of the Internet, IP frames are embedded within ATM formatted cells, which also include an ATM formatted destination address corresponding to the IP multicast address of the embedded IP frame.

On arriving in a local area network (LAN), IP frames are extracted out of their previous transport frames (e.g. ATM cells) and embedded into new transport frames (with destination address) formatted according to the topology of said LAN. For this new embedding, the MAC destination address of the IP frame is computed through a resolution process into an address compatible with said LAN.

With unicast communication, a datagram is sent from one source device to one destination device. Whether direct mapping or dynamic resolution is used for resolving a network layer address, it is a relatively simple matter to resolve addresses when there is only one intended recipient of the datagram. TCP/IP uses ARP for its dynamic resolution scheme, which is designed for unicast resolution only.

For multicast in the Internet Protocol, the datagram must be sent to multiple recipients. Thus, a relationship has to be established between the IP multicast address and the addresses of the destination devices at the MAC layer.

Normally, network interface cards (NICs) on an Ethernet LAN segment will receive only packets destined for their burned-in MAC address or the broadcast MAC address. Some means have been devised so that multiple hosts could receive the same packet and still be capable of differentiating among multicast groups.

The IEEE LAN specifications made provisions for the transmission of broadcast and/or multicast packets. In the IEEE 802.3 standard, the bit 0 of the first byte is used to indicate a broadcast and/or multicast frame. This corresponds to the address range allocated to multicast addresses, as exposed above (224.0.0.0 through 239.255.255.255).

By defining a mapping between IP multicast groups and data link layer multicast groups, physical devices are enabled to know when to pay attention to multicast datagrams.

The most commonly used multicast-capable data link addressing scheme is the IEEE 802 addressing system best known for its use in Ethernet networks. These data link layer addresses have 48 bits, arranged into two blocks of 24. The upper 24 bits are arranged into a block called the organizationally unique identifier (OUI), with different values assigned to individual organizations; the lower 24 bits are then used for specific devices.

Figure 2:
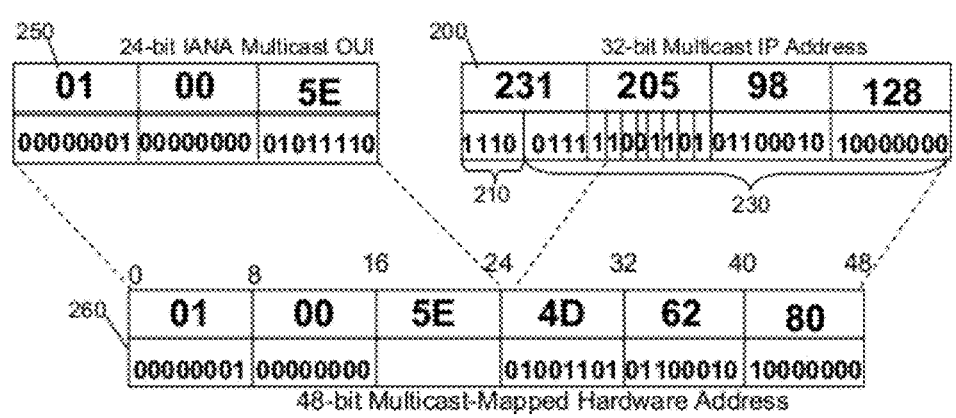
FIG. 2 represents the mapping technique for IEEE 802 Multicast MAC Address.

The Internet Assigned Number Authority (IANA) itself has an OUI that it uses for mapping multicast addresses to IEEE 802 addresses. This OUI is "01:00:5E". To form a mapping for Ethernet, 24 bits are used for this OUI and the 25th (of the 48) is always zero. This leaves 23 bits of the original 48 to encode the multicast address. To do the mapping, the lower-order 23 bits of the multicast address are used as the last 23 bits of the Ethernet address starting with "01:00:5E" for sending the multicast message. This process is illustrated in FIG. 2, which represents the resolution of an IP multicast address 200 into a IEEE 802.3 48 bits multicast MAC address 260 with the IANA multicast OUI address 250.

IP multicast address 200 consists of the bit string "1110" 210 which represents internet class D address, followed by a 28-bit multicast group address 230. To create a 48-bit multicast IEEE 802 (Ethernet) address 260, the top 24 bits are filled in with the IANA's multicast OUI (01-00-5E) 250, the 25th bit is zero, and the bottom 23 bits of the multicast group are put into the bottom 23 bits of the MAC address.

In the example of FIG. 1, emitted IP frames are conveyed through the Internet (e.g. within ATM cells) towards an Internet connection device 114*a*. There, IP frames are extracted out of ATM cells and embedded within MAC frames, according to the MAC format (IEEE 802.3) used by said Ethernet LAN 140*a*, as seen in FIG. 2.

Principles of the Invention

FIG. 3 to FIG. 6 illustrate, according to the invention, an architecture for broadcasting one of these TV channels, such as the previously illustrated CH1 TV channel emitted from server 111*a* on IP multicast address 112*a* (224.77.98.128).

Figure 3:
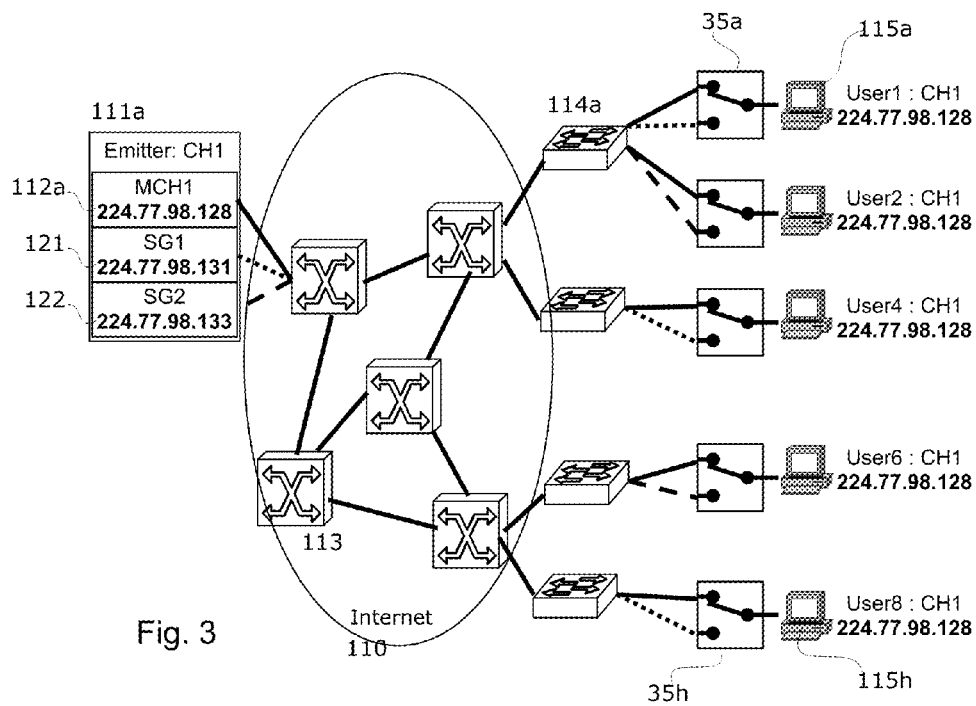
FIG. 3 illustrates an embodiment of the invention in a state of playing the main program.

FIG. 3 represents the state where user hosts 115*a* to 115*h* are playing the main program of channel CH1.

Users are identified by the TV service provider as they are authenticated at each connection, or by their ISP, or managed in another way. Users have been attributed a profile, according to which they are associated to a same targeting group, e.g. an advertising group including defined social professional categories or pertaining to same interest centre. In our example assume that USER1, USER2, USER4, USER6, and USER8 are distributed in two groups composed with:

Group SG1 which contains USER1, USER4, USER8; and
Group SG2 which contains USER2, USER6.

Each user host 115*a* to 115*h* is provided with means 35*a* to 35*h* for switching from playing the datagrams received on the main program MCH multicast address towards the datagrams received on the advertising program SG1 or SG2 multicast address 121 or 122 corresponding to its own advertising group.

Figure 4:
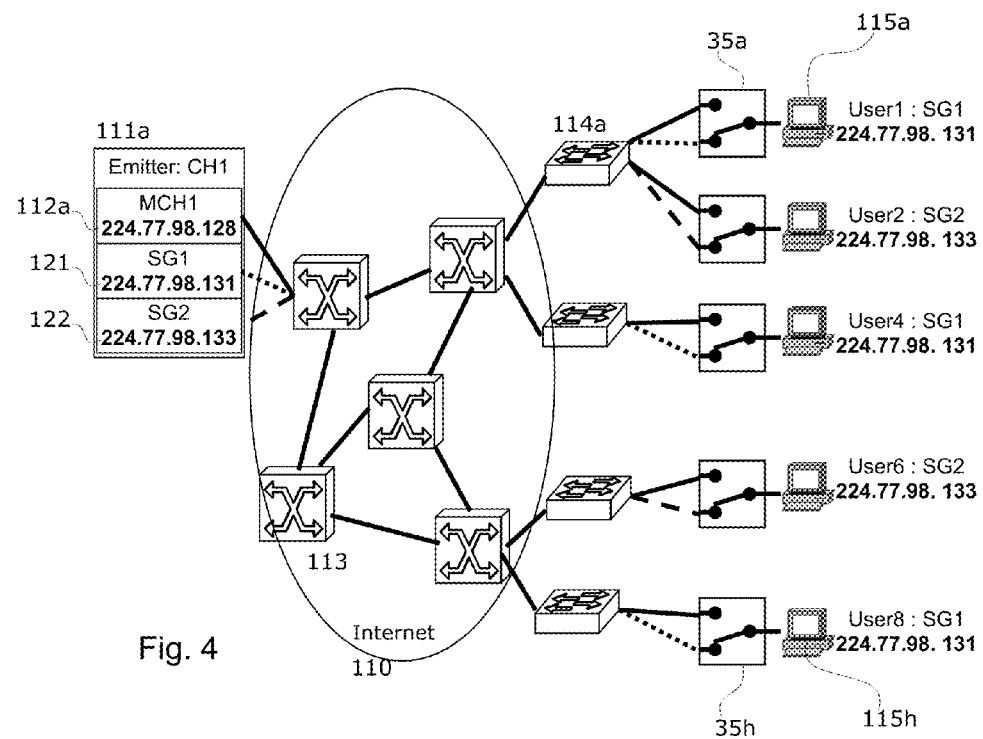
FIG. 4 illustrates an embodiment of the invention in a state of playing the advertising program for two separate user groups.

FIG. 4 represents the state where user hosts 115*a* to 115*h* are playing their own respective advertising program SG1 or SG2, for the same main channel CH1.

For CH1 advertising periods, different channels are transmitted corresponding to different Multicast addresses. In our case, Group SG1 is associated to the address 121 (224.77.98.131), and Group SG2 is associated to the address 122 (224.77.98.133).

User hosts 115*a* to 115*h* switching from main program MCH to advertising program SG1 or SG2 is realized by switching means 35*a* to 35*h*, which are implemented as software and/or hardware mechanisms comprised in the user host or distributed over several devices.

DETAILED DESCRIPTION OF THE INVENTION

New IP Multicast Address Structure

Figure 5:
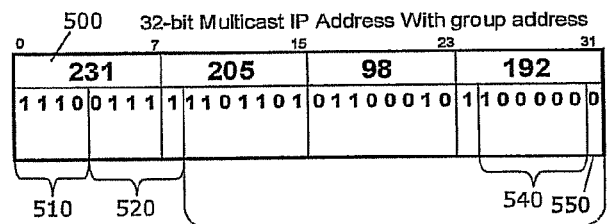
FIG. 5 represents a new structure definition for partitioning a multicast group address according to the invention.

FIG. 5 depicts a new structure proposed for allocating multicast addresses, according to the invention.

According to this structure, in a Multicast address 500 used in IPTV with personalized advertising, first four bits b"1110" 510 define a "class D" IP address, i.e. an IP multicast address.

The following five bits 520 are lost for the destination address (MAC address) of the MAC frame when computed from the IP multicast address.

The remaining 23 bits 530 are taken from the IP multicast address to build the MAC address. These 23 bits allow $2^{23}$ (2 exponent 23) addresses in standard IP Multicast. Some of these twenty three bits 530 are defined as used for coding the subgroup addresses, and thus are normally set to zero for the main programs.

In a preferred embodiment of the present invention, the lowest bits are used for coding the subgroup addresses, such as the 7 lowest bits as illustrated in FIG. 5 which allows $2^{16}$ (2 exponent 16) different main channels and $2^6$ (2 exponent 6) subchannels for each of these mains channels.

Thus, the last bit 550 is used to indicate a Multicast Group Sub Address while the six preceding bits 540 define the Sub Address, to be used as associated with the main program address. So for a given channel and one main program, up to $2^6$ sub address (64 groups) may be used, e.g. for interest centres, interactivity, or personalized advertising programs.

This structure is of interest, inter alia, because it enables to simplify or fasten numerous operations that are implemented in the present invention, as presented hereafter. As an example, computing the main program address from a group sub address is considerably easier, as it only requires setting the last seven bits of the address to zero.

Figure 6:
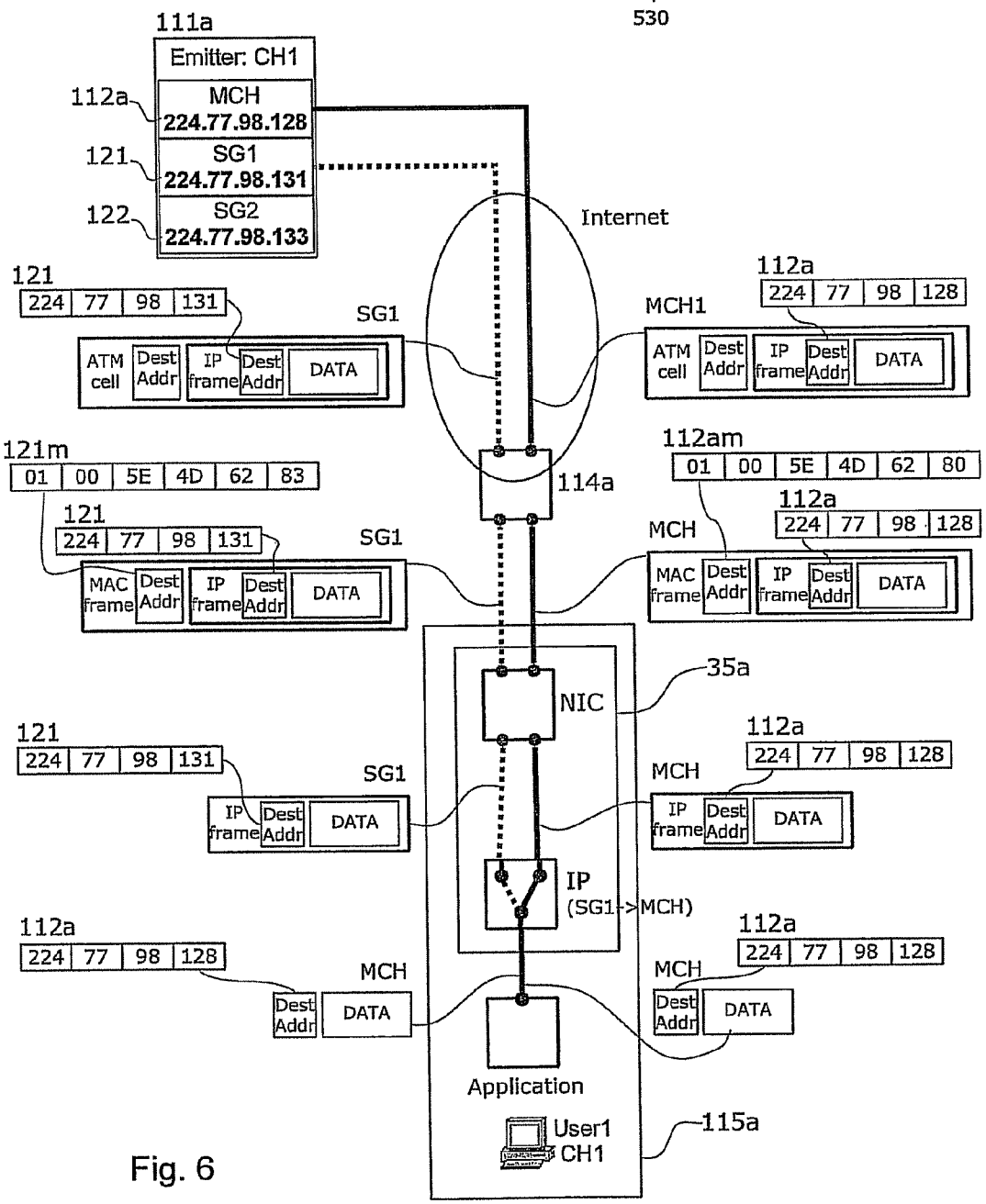
FIG. 6 illustrates the processing of main program frames and advertising program frames for an user host according to the invention.

According to the preferred embodiment of the invention, FIG. 6 illustrates schematically the course and processing of datagrams from the main program MCH and for the advertised program SG1 of the TV channel CH1 when received and played in the user host 115*a* of USER1, as previously exposed.

For the main program MCH, datagrams are conveyed as IP frames through the Internet, including a destination address 112*a* under IP format: 224.77.98.128.

They are received by the Internet connection device 114*a*, e.g. an ADSL modem or router or cable modem or add-on card. There, IP frames are embedded into MAC frames, and their destination address 112*a* is resolved into a MAC address 112*am* (01 00 5E 4D 62 80) inserted within the MAC frames.

For the advertising program SG1, datagrams are conveyed as IP frames through the Internet, including a destination address 121 under IP format: 224.77.98.131.

IP frames for SG1 program are received by the same Internet connection device. There, SG1 IP frame are embedded into MAC frames, and their destination address 121 is resolved into a MAC address 121*m* (01 00 5E 4D 62 83) which is inserted within the corresponding SG1 MAC frames. Thus, a MAC frame is built by: embedding the IP frame in the MAC frame; resolving the destination address 121 into the MAC Address 121*m*; and inserting the MAC address 121*m* into the MAC frame.

Network Interface Controller

Datagrams are then transmitted as MAC frames to the network interface controller or NIC card. This NIC identifies and accepts datagrams which are to be received by the device it belongs to.

In this embodiment, datagrams from both MCH and SG1 programs are accepted by NIC and transmitted to the IP layer.

The datagrams are identified through logical operation using the switching datum stored in the user host 115*a*. As this user host belongs to the advertising group SG1, it stores a switching datum configured for receiving the datagram from the multicast address 121*m* of the advertising group SG1, in addition to datagrams received from main program multicast address 112*a*.

For the NIC processing, the switching datum preferably comprises a sequence of bits constituting a logical mask, arranged so as to obtain the main program address 112*am* when its bits are applied with an XOR (eXclusive Or) operation to the corresponding bits of advertising program address 121*m*.

Figure 8:
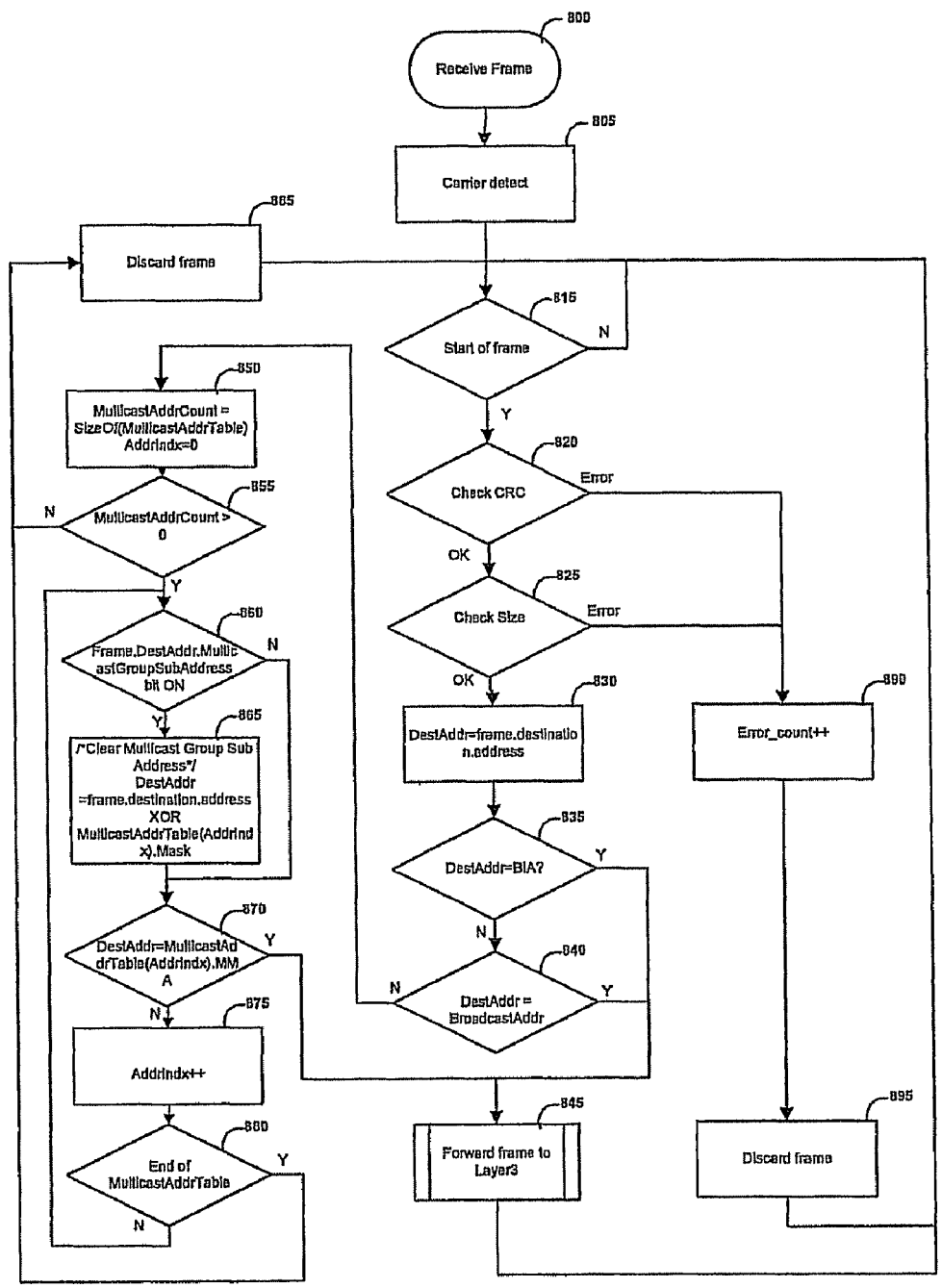
FIG. 8 is a block diagram illustrating the processing of incoming frames in the network interface controller according to the invention.

Through use of this switching datum, in the NIC, as shown in FIG. 6, the destination address 121*m* (01 00 5E 4D 62 83) of the MAC frame is computed through this logical mask (00 00 00 00 00 03) into a computed destination address (01 00 5E 4D 62 80) corresponding to MAC frames for the main program. As illustrated in FIG. 8 hereafter (see step 865), this computed address is then compared with the main program address 112*am*, and positive comparison induces that this frame is also to be transmitted to the IP layer.

As MAC frames processing has to be very fast, a hardware module including hard-wired logical circuit is a preferred solution for obtaining the computed destination test address.

The NIC processes the accepted MAC frames at data link control layer level and forwards their payload, as IP frames with destination addresses 112*a* or 121, towards the IP layer.

NIC: Processing of Multicast Processing

As represented in FIG. 7, the NIC switching datum is stored within a data table 770 called "NIC_MulticastAddrTable".

This table 770 stores a list of multicast MAC addresses 771, corresponding to the main programs (such as MCH) of different channels, such as CH1 (773) and CH2 to CH4 (775).

Each of these main program addresses may have a multicast sub group address datum 772 associated, corresponding to the multicast address 774*a* of its personalized advertising group (such as SG1 or SG2) for the associated channel (such as CH1). In these columns, the related IP addresses 773*a*, 774*a* have been noted in comments for clarity, but are not stored in the table.

For each row (or entry) of the table 770, the datum in second column 772 represents the mask to be XOR-ed with the received destination MAC address (121*m*; FIG. 6) for retrieving the MAC address (112*am*; FIG. 6) associated to the main program MCH of the related TV channel CH1.

When using the specific partitioning illustrated hereabove (see FIG. 5), it means that said mask has all bits equal to zero except for the lowest bits which are the lowest bits of the multicast sub group address, for example the seven lowest bits.

In the table, the first entry 773 corresponds to address 224.77.98.128 which is the address of CH1 in the previous example. The mask corresponding to the associated Multicast Group Sub Address 224.77.98.131 (which is the advertising address for group SG1) is x"00.00.00.00.00.03" 774. This mask, when XOR-ed with the MAC address 01.00.5E.4D.62.83 gives 01.00.5E.4D.62.80 which corresponds to the IP address 224.77.98.128. This method enables to receive frames having different but associated addresses (112*am* and 121*m*), and to process them as if they actually had the same address (112*am*). The datum "00.00.00.00.00.00" 776 denotes "No alternative address" for the multicast MAC addresses 775.

FIG. 8 depicts the receiver part algorithm of the Network Interface Controller for each incoming MAC frame, as related to the invention in the preferred embodiment.

At step 805, the process is waiting carrier detect to start.

At step 815, when carrier detect has been detected, the process waits for a start of frame to begin processing and store data in a buffer.

At step 820, CRC is calculated using the data part as well as the header. Said calculated CRC is compared to the received CRC which has been appended to the frame. If both CRC's match, then the process continues at step 825; else an error count is incremented 890 and the frame is discarded 895.

At step 825, a checking on the frame size is performed. Any frame which is received and which is less than 64 bytes (46 bytes of data) is illegal, and is called a "runt". In most cases, such frames arise from a collision, and while they indicate an illegal reception, they may be observed on correctly functioning networks. In the same manner any frame which is received and which is greater than the maximum frame size which is 1518 bytes (1500 bytes of data), is called a "giant". In all cases (runt or giant frames), if the size is not valid, an error count is incremented 890 and the frame is discarded 895.

If the size of the frame is valid, then control is given to step 830.

At step 830, a local variable named "DestAddr" is initialised with the received frame destination address (MAC address).

At step 835, a test is done to verify if the destination address is equal to the "Burned-In Address" (BIA) which is the MAC address that is permanently attached to a NIC product by the manufacturer. If the destination address matches the BIA, the received frame is considered as a Unicast datagram and forwarded to layer 3 (IP layer) 845, and the process loops to wait for the reception of a new frame at step 815.

Else the process continues to step 840.

At step 840, a test is done to verify if the destination address is equal to the Broadcast Addresses. If the destination address matches the Broadcast Addresses, the received frame is forwarded to layer 3 (IP layer) 845 and the process loops to wait for the reception of a new frame at step 815. Else the process continues to step 850.

Beginning at step 850, multicast addresses are more specifically processed. Variables are initialized to scan all multicast addresses. A local variable "MulticastAddrCount" is initialised with the size of the table "NIC_MulticastAddrTable" (770; FIG. 7) and an index "AddrIndx" is set equal to zero as a local variable.

At step 855, a test is performed to determine if at least one Multicast address has been defined in the table 770.

If no multicast address has been defined, the frame is discarded 885 and the process loops to wait for the reception of a new frame 815.

Else the process continues to step 860.

At step 860, a test is performed to determine if the lower bit of the frame destination address is set to one.

If it is the case, the received frame contains a Multicast Group Sub Address and the control is given to step 865. Otherwise control is given to step 870.

At step 865 the local variable "DestAddr" is set to a computed address which is the result of an eXclusive OR (XOR) between the received frame destination address and the mask corresponding to the processed entry of the MulticastAddrTable.

For example if a user belonging to group SG1 is watching CH1, we have:

|  | main multicast address | advertising address |
|---|---|---|
| Decimal IP address | 224.77.98.128 (112a) | 224.77.98.131 (121) |
| Hexadecimal IP addr | E0.4D.62.80 | E0.4D.62.83 |
| Frame destination MAC addr | 01 00 5E 0D 62 80 (112am) | 01 00 5E 0D 62 83 (121m) |

In this case, the mask 774 associated to the Multicast Group sub address 121m (or Advertising address) is x"00 00 00 00 00 03". Applying this mask on the advertising address 121m gives the multicast address 112am for main program MCH. By these means the Network Interface Card is able to intercept both MAC addresses (main 112am and advertising 121m). If the lower bit of the destination address is not set to one, the process continues in step 870.

At step 870, a test is performed by comparing the "AddrIndx" counter variable with the "DestAddr" variable to determine if the received frame destination address, possibly XOR-ed with the mask associated to Multicast Group sub address matches the multicast address.

If it is the case, then the received MAC frame is processed into IP frame and forwarded to layer 3 module (IP layer) 845, and the process loops to wait for the reception of a new frame at step 815.

Else the variable AddrIndx is incremented by one 875 to point to the next entry of the table 770 "NIC_MulticastAddrTable".

At step 880, a test is performed by comparing the "AddrIndx" counter variable with the size (MulticastAddrCount) of the table to determine if the end of the table 770 "NIC_MulticastAddrTable" has been reached.

If it is the case, the incoming MAC frame is discarded 885 and the process loops to wait the reception of a new frame at step 815.

Else the process of table scanning continues with a new iteration at step 860.

Through this algorithm, in the Network Interface Controller, MAC frames incoming in the LAN will be accepted and processed to IP layer:
either with 112am for the main program MCH,
or with destination MAC address 121m for the relating personalized advertising program SG1.

Thus, the NIC will accept, process and transmit to the IP layer datagrams for both main program and advertising program only for the channel the user host 115a is registered to (i.e. tuned on).

IP Layer

For the main program MCH, datagrams are received in IP layer as IP frames with a destination address 112a under IP format (224.77.98.128).

For the advertising program SG1, datagrams are received in IP layer as IP frames with a destination address 121 under IP format (224.77.98.131).

Frames arriving at IP layer with a destination address corresponding to the advertising program, i.e. 121 (224.77.98.131), are then modified according to the switching datum stored in the user host 115a. As this user host 115a belongs to the advertising group SG1, its switching datum is configured for receiving the datagrams from the multicast address 121 of the advertising group SG1.

For the IP processing, the switching datum may be stored as an IP formatted addressed representing the IP multicast address 121 of the advertising group SG1 the user host 115a belongs to. However a logical mask, used in software or hardwired circuits, may also be used as exposed above for the NIC processing.

Through use of this switching datum, in the IP layer module, the destination address 121m (01 00 5E 4D 62 83) of the frame is checked against the switch datum stored in memory. If the destination address found in the frame is the same as the group advertising address identified by the switching datum, the destination address of the frame is replaced with the destination address 112am (01 00 5E 4D 62 80) corresponding to the main program. Modified datagrams are then processed for IP level and transmitted to the application level, e.g. to the player software of the computer or the player module of the digital set.

Thus, the datagram of the advertising program are fully received and played by the player of the user host 115a as if they were coming from the main program multicast address.

In the preferred embodiment, for inserting an advertising program into the main program, the server 111a interrupts its emission on the main program MCH multicast address 112a corresponding to the main program MCH. At the same time, emission of personalized advertising programs SG1, SG2 begins at the same time.

All user hosts 115a to 115h thus replace the main program MCH they were previously playing with their group personalized advertising SG1 or SG2, without interference between main and advertising programs.

IP Processing of Multicast Addresses

As represented in FIG. 9, the switching datum is stored within a data table called "IP_MulticastAddrTable".

This table 900 stores a list of multicast addresses 910, corresponding to the main programs (such as MCH) of different channels, such as CH1 (930) and CH2 to CH4 (950).

Each of these main program addresses may have a multicast sub group address 920 associated, corresponding to the multicast address of its personalized advertising group (such as SG1 or SG2) for the associated channel (such as CH1)

Figure 10:
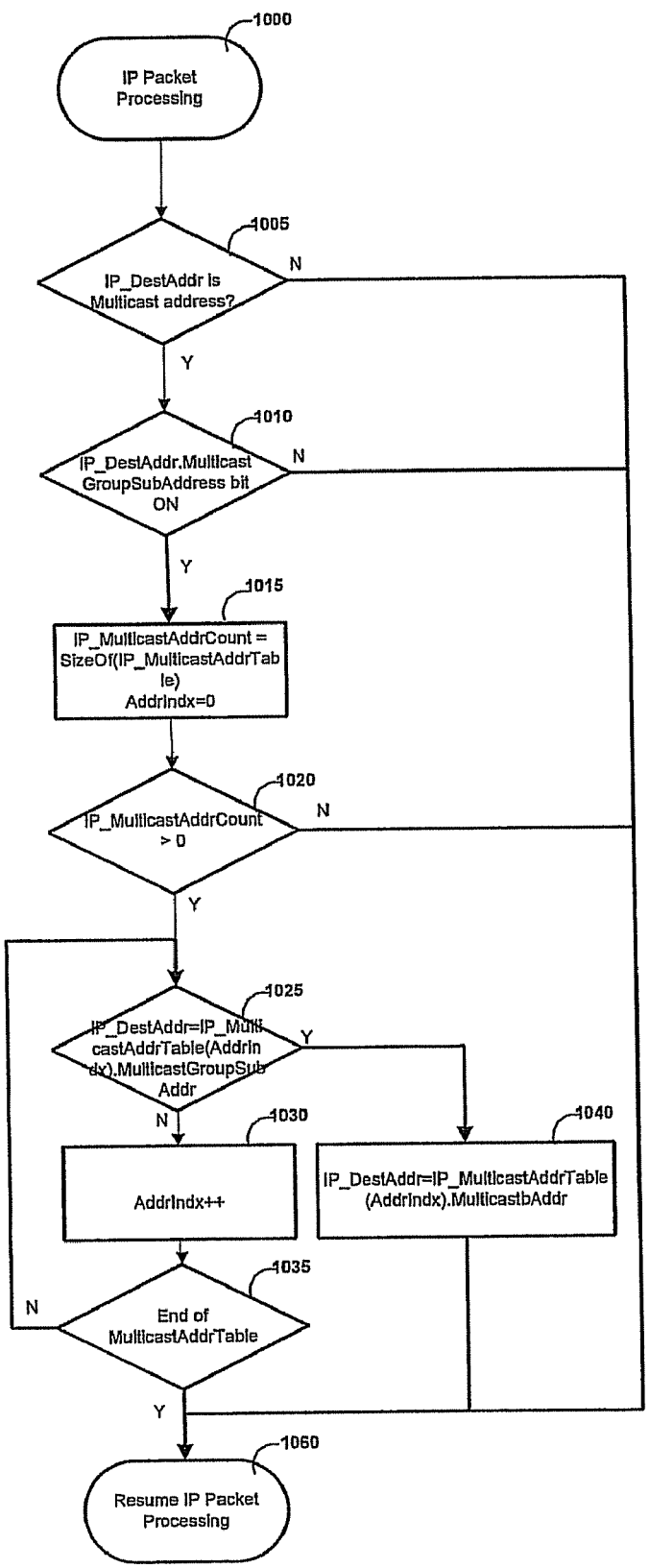
FIG. 10 is a block diagram illustrating the processing of incoming frames in the IP layer according to the invention.

FIG. 10 depicts the algorithm for IP packet processing (partially), as related to the invention in the preferred embodiment.

At step 1000, the process is entered after an interrupt is raised by the MAC layer.

At step 1005, a test is done to determine if the IP destination address of the received IP frame is a multicast address (first four higher bits equal to b"1110"). If it is not the case, then the process is resumed 1060.

If the IP destination address is a multicast address, then another test 1010 is performed to determine if the IP destination address of the received IP frame may be a Multicast Group sub address (i.e. an advertising address). This is done by checking if the address is even (last bit at zero).

If it is not the case, then the process is resumed 1060. If the IP destination address is a Multicast Group sub address (such as 121 FIG. 6), then the process continues to scan the IP Multicast address table (900; FIG. 9) in step 1015.

At step 1015, variables are initialized to scan all IP multicast group sub addresses. A local variable "IP_MulticastAddrCount" is initialised with the size of the table "IP_MulticastAddrTable" and an index "AddrIndx" is set equal to zero as a local variable.

At step 1020, a test is performed to determine if at least one IP Multicast address 910 has been defined.

If no IP multicast address has been defined, the process is resumed 1060.

Else the process continues to step 1025.

On each iteration of step 1025, a test is performed to determine if the IP Destination address 121 of the IP frame matches the IP Multicast Group Sub Address 940 corresponding to the entry defined by the index AddrIndx in the table IP_MulticastAddrTable 900.

If the address does not match, the variable AddrIndx is incremented 1030 by one to point to the next IP_MulticastAddrTable entry 950, 960 and the control is given to step 1035.

If the address matches, then the IP destination address 121 of the processed frame is replaced 1040 by the IP Multicast address 930 (i.e. address 112a of main program MCH) corresponding to this entry in the table 900.

(When using of the specific partitioning illustrated in FIG. 5, it means that the lower 7 bits of the IP destination address are set to zero).

The process is then resumed 1060.

At step 1035, a test is performed by comparing the "AddrIndx" counter variable with the size (IP_Multicast AddrCount) of the table to determine if the end of the table "IP_MulticastAddrTable" has been reached.

If it is the case, the process is resumed 1060.

Else the process of table scanning continues with a new iteration at step 1025.

At step 1060, the processing of IP packet is resumed.

Through this algorithm, in the IP layer module:

any IP frame received with a destination address for main program is processed normally, and any IP frame received with a destination address stored in the table 900 (IP_MulticastAddrTable) is modified so as to be further processed with a destination address 112a corresponding to its related main program MCH.

Thus, if the user host 115a is configured for playing all datagrams incoming on the multicast address 112a, then all datagrams coming from both multicast addresses 112a (for main program MCH) and 121 (for advertising program SG1) are played by this user host.

Alternate Embodiment

In the alternate embodiment, the switching means 35a transmit datagrams to the application layer only from one multicast address, either from main program MCH address 112a or from the advertising program SG1 or SG2 address 121 or 122, according to the switching datum specific to the related user host 115a respectively 115b. This switching may be done, as an example, by filtering datagrams from the unwanted address in the NIC or in the IP layer module.

The switching may be triggered by a specific signal emitted on the main program MCH multicast address 112a. Switching may also be triggered by an analysis of the state of the user host, e.g. from a timer or from users watching it, or an analysis of the data transmitted from one of the multicast addresses. As an example, when the user host detects program data incoming from its personalized advertising multicast address 121, switching is triggered and main program data are stopped.

This enables to have a default advertising program emitted on the main program multicast address 112a, while several different personalized advertising programs SG1, SG2 are emitted only for users hosts that have been classified in personalized advertising groups.

Furthermore, switching datum may be changed according to the state or conditions of the user hosts, e.g. according to time or to watchers.

Application Layer

Application enabling watching IP TV may typically be an internet browser running in a computer, or a digital TV set, or in a standalone device called "Set Top Box" (STB) which is connected to an analogical TV set. Connection on a TV channel is done by a command. This Internet Browser supports command such as "IGMP://url:port", which cause "leaving" the previous IGMP Group and "Joining" the next IGMP group, i.e. channel, specified in the command.

In the preferred embodiment, this command is modified to pass the Multicast group sub address as parameter, so the command looks like:

"IGMP://TV_Channel_address/!Advertising_address"

Execution of this command will generate two "leave" and two "join" IGMP commands. One for the main TV channel address and an other one for the Multicast Group sub address corresponding to the advertising channel.

The present invention provides a computer program comprising instructions for carrying out the steps of the methods described herein, wherein the computer program is executed on a computer system. A computer program product of the present comprises: a computer readable storage medium; and instructions of a computer program. The instructions are stored in the computer readable storage medium are configured to perform (and are for performing) the methods described herein upon being executed on a computer system (i.e., executed by a processor of the computer system).

While the invention has been particularly shown and described mainly with reference to a preferred embodiment, it will be understood that various changes in form and detail may be made therein without departing from the spirit, and scope of the invention.

What is claimed is:

1. A method, comprising:

receiving an Internet Protocol (IP) frame, said IP frame comprising content of a second multimedia program and a second multicast address of the second multimedia program;

ascertaining that the second multicast address in the IP frame is a multicast sub group address of a first multimedia program of a television (TV) channel being played at a user host;

responsive to said ascertaining, replacing in the IP frame the second multicast address with the first multicast address; and after said replacing the second multicast address, transmitting the IP frame to the user host to replace or be inserted into the first multimedia program of the TV channel being played at the user host.

2. The method of claim 1, wherein an IP multicast address table stores an IP list of multicast addresses and subgroup addresses associated with each multicast address, wherein the multicast addresses in the IP list comprises the first multicast address, and wherein said ascertaining comprises ascertaining that the second multicast address in the IP frame is a multicast subgroup address in the IP multicast address table that is associated with the first multicast address in the IP list.

3. The method of claim 1, wherein said receiving the IP frame is performed in an IP layer, wherein prior to said receiving the IP frame, the IP frame is embedded in a Medium Access Control (MAC) frame, wherein the method further comprises:
while the IP frame is embedded in the MAC frame, applying a switch datum to the second multicast address in the IP frame to determine a computed address;
determining that the computed address is the first multicast address; and
after said determining that the computed address is the first multicast address, forwarding the IP frame in the MAC frame to the IP layer.

4. The method of claim 3, wherein said applying the switch datum comprises applying a first logical mask to the second multicast address in the IP frame to determine the computed address.

5. The method of claim 4, wherein said applying the first logical mask comprises combining the bits of the logical mask with corresponding bits of the second multicast address in accordance with an Exclusive OR (XOR) operation.

6. The method of claim 4, wherein said applying the switch datum is performed in a Network Interface Controller (NIC) that comprises a NIC multicast address table, wherein the NIC multicast address table stores a NIC list of multicast addresses and a logical mask associated with each multicast address in the NIC list, wherein the logical masks in the NIC list comprise the first logical mask, wherein the multicast addresses in the NIC list comprises the first multicast address to which the first logical mask in the NIC list is associated, and wherein the method comprises iteratively applying the logical masks in the NIC list to the second multicast address in the IP frame until the first logical mask is applied to the second multicast address in the IP frame to determine the computed address that consists of first multicast address.

7. The method of claim 3, wherein before said applying the switch datum, said method further comprises building the MAC frame, said building the MAC frame comprising:
embedding the IP frame in the MAC frame; and
resolving the second multicast address into a MAC Address; and
inserting the MAC address into the MAC frame.

8. The method of claim 7, wherein after said building the MAC frame and before said applying the switch datum, said method further comprises determining that the MAC address in the MAC frame is not equal to a burned-in address that is permanently attached to the Network Interface Controller.

9. The method of claim 7, wherein after said building the MAC frame and before said applying the switch datum, said method further comprises determining that a lowest bit of the second multicast address in the IP frame has a value indicating that the second multicast address is a multicast subgroup address.

10. The method of claim 1, wherein after said receiving the IP frame and before said ascertaining, determining that a highest four bits in the second multicast address in the IP frame consists of a value indicating that the second multicast address is an Internet class D address.

11. The method of claim 1, wherein after said receiving the IP frame and before said ascertaining, determining that a lowest bit of the second multicast address in the IP frame has a value indicating that the second multicast address is a multicast subgroup address.

12. The method of claim 1, wherein 23 contiguous bits of the second multicast address in the IP frame consist of:
7 contiguous bits identifying a multicast subgroup address; and
16 contiguous bits identifying the TV channel being played at the user host.

13. The method of claim 1, wherein said transmitting the IP frame to the user host comprises transmitting the IP frame to the user host to replace the first multimedia program of the TV channel being played at the user host.

14. The method of claim 1, wherein said transmitting the IP frame to the user host comprises transmitting the IP frame to the user host to be inserted into the first multimedia program of the TV channel being played at the user host.

15. A computer program product, comprising:
a computer readable storage device;
instructions of a computer program, said instructions stored in the computer readable storage medium and configured to be to perform a method upon being executed by a processor of a computer system, said method comprising:
receiving an Internet Protocol (IP) frame, said IP frame comprising content of a second multimedia program and a second multicast address of the second multimedia program;
ascertaining that the second multicast address in the IP frame is a multicast sub group address of a first multimedia program of a television (TV) channel being played at a user host;
responsive to said ascertaining, replacing in the IP frame the second multicast address with the first multicast address; and
after said replacing the second multicast address, transmitting the IP frame to the user host to replace or be inserted into the first multimedia program of the TV channel being played at the user host.

16. The computer program product of claim 15, wherein said receiving the IP frame is performed in an IP layer, wherein prior to said receiving the IP frame, the IP frame is embedded in a Medium Access Control (MAC) frame, wherein the method further comprises:
while the IP frame is embedded in the MAC frame, applying a switch datum to the second multicast address in the IP frame to determine a computed address;
determining that the computed address is the first multicast address; and
after said determining that the computed address is the first multicast address, forwarding the IP frame in the MAC frame to the IP layer.

17. The computer program product of claim 16, wherein said applying the switch datum comprises applying a first logical mask to the second multicast address in the IP frame to determine the computed address.

18. The computer program product of claim 17, wherein said applying the first logical mask comprises combining the bits of the logical mask with corresponding bits of the second multicast address in accordance with an Exclusive OR (XOR) operation.

19. A system, comprising:
means for receiving a Medium Access Control (MAC) frame comprising an Internet Protocol (IP) frame embedded therein and a MAC address, said IP frame comprising content of a second multimedia program and a second multicast address of the second multimedia program, said MAC address having been resolved from the second multicast address; and
means for determining that the second multicast address in the IP frame embedded in the MAC frame is linked to a first multicast address of a first multimedia program of a television (TV) channel being played at a user host.

20. The system of claim 19, further comprising:
means for receiving the IP frame in an IP layer after said determining that the second multicast address in the IP frame embedded in the MAC frame is linked to the first multicast address; and
means for deciding to replace, in the IP frame received in the IP layer, the second multicast address with the first multicast address.

* * * * *